United States Patent [19]

Brimeyer et al.

[11] Patent Number: 4,720,122
[45] Date of Patent: Jan. 19, 1988

[54] TRACTOR FRONT-END WEIGHT OPTION

[75] Inventors: Dennis A. Brimeyer; Terrence H. Maneman, both of Dubuque, Iowa

[73] Assignee: Deere & Company, Moline, Ill.

[21] Appl. No.: 59,929

[22] Filed: Jun. 9, 1987

Related U.S. Application Data

[63] Continuation of Ser. No. 821,386, Jan. 21, 1986, abandoned.

[51] Int. Cl.$^4$ .................... B62D 37/04; B62D 63/04
[52] U.S. Cl. .................................................. 280/759
[58] Field of Search .................. 280/758, 759, 760; 293/102; 180/900

[56] References Cited

U.S. PATENT DOCUMENTS

| | | | |
|---|---|---|---|
| 3,023,024 | 2/1962 | McAdams et al. | 280/759 |
| 3,490,787 | 1/1970 | Latterman et al. | 280/759 |
| 3,517,941 | 6/1970 | Lazzeroni | 280/759 |
| 3,614,135 | 10/1971 | Eid | 280/759 |
| 3,635,493 | 1/1972 | Barth et al. | 280/759 |
| 3,680,651 | 8/1972 | Termont | 280/759 |
| 3,758,132 | 9/1973 | Elfes et al. | 280/759 |
| 3,991,891 | 11/1976 | Cox | 280/759 |
| 4,067,415 | 1/1978 | Samide | 280/759 |
| 4,094,534 | 6/1978 | Welke et al. | 280/759 |
| 4,232,883 | 11/1980 | Bourgeous | 280/759 |
| 4,299,405 | 11/1981 | Withers et al. | 280/759 |
| 4,363,412 | 12/1982 | Patel | 280/759 |
| 4,462,611 | 7/1984 | Sieren | 280/759 |
| 4,580,811 | 4/1986 | Wykhvis et al. | 280/759 |

FOREIGN PATENT DOCUMENTS

2024739  1/1980  United Kingdom ................ 280/759

Primary Examiner—Richard A. Bertsch
Attorney, Agent, or Firm—Henderson & Sturm

[57] ABSTRACT

In a tractor having a front end adapted to have an optional piece of equipment connected thereto, a front end weight option arrangement which comprises a mounting plate secured to the front end of the tractor, which mounting plate has an exposed front surface adapted for mating engagement with the rear surface of the optional piece of equipment, and the mounting plate further having openings formed therein which are alignable with openings of the optional piece of equipment such that fasteners may be inserted through both sets of openings for securement of the optional piece of equipment to the mounting means. A weight plate is provided for interposition between the mounting plate and the optional piece of equipment, and any number of identical weight plates may be mounted in a longitudinal fore and aft arrangement between the optional piece of equipment and the mounting plate. Each weight plate has openings formed therein which are alignable with the respective openings of the mounting plate in the optional piece of equipment for receipt of the fasteners; each weight plate further has front and rear surfaces which are substantially identical with the front and rear surfaces, respectively, of the mounting plate and the optional piece of equipment, whereby one or more weight plates can be mounted in a mating relationship between the tractor front end mounting plate and the optional piece of eauipment without the need of additional equipment for mounting purposes.

7 Claims, 2 Drawing Figures

TRACTOR FRONT-END WEIGHT OPTION

This is a continuation of co-pending application Ser. No. 821,386, filed on Jan. 21, 1986, now abandoned.

TECHNICAL FIELD

This invention relates to a front-end weight option for a tractor, and more particularly relates to a weight option adapted to be mounted in a sandwich manner between the front end of the tractor and any optional piece of equipment particularly adapted to be connected to the tractor front-end.

BACKGROUND ART

Quite often with tractors, it is desirable and even necessary to obtain more traction at the front end of the tractor and/or to provide more weight there for rendering more effective optional pieces of equipment adapted to be mounted on the front end of the tractor. Such equipment may be in the nature of V-plows, dozers, scarifiers and the like.

Prior art includes weights which are added to the front wheels, and as shown in U.S. Pat. No. 3,635,493, identical weights mounted transversely of the front end of a tractor in combination with a transverse base weight. The latter arrangement is more effective than the wheel weights; however, use of the latter arrangement obviates the provision for mounting optional pieces of equipment on the front of the agricultural tractor.

Those concerned with this type of problem recognize the need for an improved tractor front end weight arrangement.

DISCLOSURE OF THE INVENTION

The present invention relates to a tractor having a front end adapted to have an optional piece of equipment connected thereto, and a novel front-end weight option, the overall improvement comprising a mounting plate secured to the front end of the tractor having a front exposed surface cooperative for mating engagement with the rear surface of the optional piece of equipment, regardless of the type of piece, and which mounting plate has openings formed therein for receiving fastening means such as bolts, inserted through the optional piece and into the mounting plate. The weight option is insertable between the mounting plate and the optional piece in a sandwich-like manner, the weight option itself having openings formed therein alignable with the openings of the mounting plate for receiving the fastening bolts inserted therethrough, and further wherein the front end weight option itself has front and rear surfaces each substantially identical in shape and surface arrangement with the respective front and rear surfaces of the mounting plate and the optional piece of equipment, whereby one or more of said plate options can be interposed and connected between the mounting plate and the optional piece without the requirement of additional equipment.

An object of the present invention is the provision of an improved tractor front-end weight arrangement.

Another object of this invention is to provide an arrangement for adding more weight to the front end of a tractor without affecting the additional adding thereto of optional pieces of equipmeht.

It is still another object of this invention to provide a weight arrangement whereby additional predetermined amounts of weight can be added to the front end of a tractor without eliminating the addition to the front end of optional pieces of equipment.

Yet another object of this invention is the addition to the front end of the tractor of additional, predetermined amounts of weight without the requirement of providing extra parts for continued utilization of front-end mounted optional pieces of equipment.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
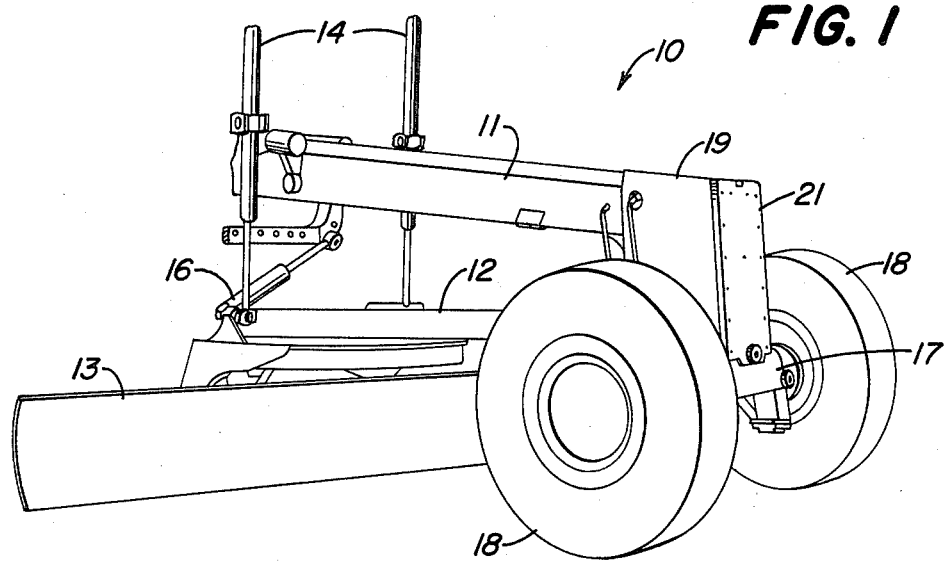
FIG. 1 is a perspective view of a portion of the front of a tractor.

Referring now to the drawings, wherein like reference numerals designate identical or corresponding parts throughout the several views, FIG. 1 shows a tractor (10) of the motor grader type of tractor which includes a mainframe (11) from which is suspended a circle unit (12) and a blade (13). The blade is provided with conventional blade lift cylinders (14) and a cylinder (16) is provided for shifting the circle sideways. A front axle (17) for mounting front wheels (18) is mounted at the front end (19) of the tractor (10).

At the front end (19), a rectangularly formed mounting plate (21) is secured by means (not shown) to the front end (19) of the tractor (10), and which mounting plate (21) has a plurality of openings (22) formed therein in a predetermined design. The plate (21) further has a cut-out (23) formed at the top thereof, and a front axle pivot (24) protudes from the bottom end thereof. The front exposed surface (26) of the mounting plate is relatively flat and smooth with the exception of the provision of the pivot (24).

Figure 2:
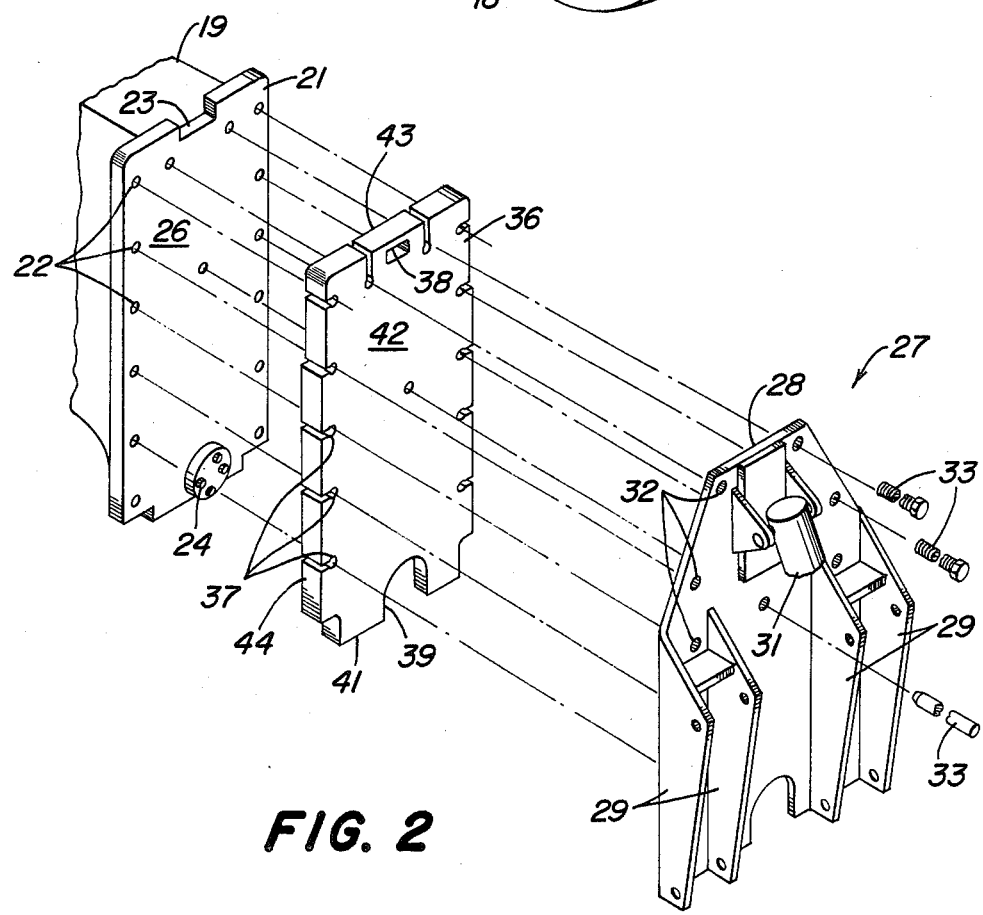
FIG. 2 is an enlarged exploded view showing the improved front end of the tractor, a single plate option, and a portion of an option piece of equipment.

A portion of an optional piece of equipment is indicated generally at (27) in FIG. 2, this portion including machined pads (28) having a relatively flat and smooth rear surface which is adapted to mate in a cooperative manner with the surface (26) of the mounting plate (21). Pairs of ears (29) are formed on the forward portion of the optional piece (27) for holding and supporting in conventional manner optional pieces of equipment such as scarifiers, V-plows and the like. A portion of a cylinder (31) for effecting movement of such an optional piece of equipment is partially shown. Further, openings (32) are formed in the optional piece (27) through which fasteners (33) are inserted. As the openings (32) are alignable with the openings (22) in the mounting plate (21), by insertion and securement of the fasteners (33) the optional piece (27) can be secured to the mounting plate (21).

One or more weight plate options (36) may be inserted between the mounting plate (21) and the optional piece of equipment (27) as best illustrated by the exploded view in FIG. 2. Each weight plate option (36) being the same, only one will be described. The plate (36) has a rectangular outline such that in elevation as shown in FIG. 2 its outline is substantially identical to the rectangular outline of the mounting plate (21). A plurality of openings (37) are formed in the plate (36), which openings are alignable with the openings (22) of the mounting plate and the openings (32) of the optional piece of equipment (37) whereby the plate (36) can be fastened between the plate (21) and the optional piece (27) by the insertion through the weight plate (36) openings (37) by the fasteners (33).

An enlarged opening (38) is formed in the upper part of the plate (36), which opening (38) is alignable with the cut-out (23) of the mounting (21) whereby a lifting hook or the like can be used to place the weight plate (36) between the mounting plate (21) and the optional piece (27), if the latter is used, for fastening purposes. It will be understood that in certain conditions the optional piece (27) of equipment may not be used, and thus even though one or more weight plates (36) are used, the same fasteners (33) are applied to the weight plates (36) for connecting it to the mounting plate (21). A semicircular cut-out (39) is formed in the base (41) of the weight plate (36) such that the plate (36) may fasten in a cooperative, mating arrangement with the mounting plate (21), accommodating the front axle pivot (24).

The front surface (42) and the rear surface (43) of the weight plate (36) are both substantially flat and smooth and mate in a cooperative manner with the front surface (26) of the mounting plate (21) and the rear surface (28) of the optional piece (27). In this manner, and with the alignment of the respective openings (22), (37) and (32), the three pieces can be connected by the fasteners (33) without the need of additional equipment. Should a large number of weight plates (36) be utilized, it may be that the length of the fasteners (33) must be increased to accommodate the additional weight plates (36).

Referring to FIG. 2, it is seen that the openings (37) are formed in a keyhold shape, being open to the peripheral edge (44) of the plate (36). A continuous flame cut-type process is used about the periphery (44) of each weight plate (36) to form the openings (37) therein, thus providing for an effective and cost efficient manner of manufacturing the weight plate (36) as to the openings (37).

From the aforementioned, it can be seen that all of the previously stated objectives have been achieved. Obviously, many modifications and variations of the present invention are possible in light of the above teachings. It is therefore to be understood that, within the scope of the appended claims, the invention may be practiced otherwise than as specifically described.

We claim:

1. In a tractor having a front end adapted to have an optional piece of equipment connected thereto, a front-end weight option improvement comprising:

an optional piece of equipment having a rear surface and plurality of first openings formed therein;

mounting means secured to the front end of the tractor having a predetermined outline in elevation, and having an exposed front surface adapted for mating engagement with said rear surface of said optional piece of equipment, and having further second openings formed therein about top and side edges thereof and alignable with said first openings;

weight means mountable between said mounting means and said optional piece, said weight means having third openings formed therein about top and side edges thereof and alignable with said first and second openings, and further wherein said weight means comprises at least one plate, each said plate having front and rear surfaces identical to the front and rear surfaces of said mounting means and said optional piece, respectively whereby said at least one plate can be sandwiched between said mounting means and said optional piece without the requirement of additional equipment; and fastening means insertable from the front of and through all said aligned openings in said mounting means, each said plate and said optional piece.

2. The invention defined in claim 1 and further wherein said weight means has an outline in elevation substantially identical to said mounting means.

3. The invention defined in claim 1 and further wherein said mounting means comprise a plate the exposed surface of which is relatively flat and wherein a cut-out is formed in the top portion thereof.

4. The invention defined in claim 3 and further wherein said weight means comprises at least one plate the front and rear surfaces of which are relatively flat.

5. The invention defined in claim 4 and further wherein an enlarged opening is formed in each said weight plate alignable with said cut-out for receiving a lifting hook or the like.

6. The invention defined in claim 5 and further wherein said weight plate openings are continuous process flame cut in a keyhole manner from the periphery of said weight plate.

7. The invention defined in claim 1 and further wherein said weight means comprises at least one plate, each said plate having front and rear surfaces identical to the front and rear surfaces of said mounting means and the optional piece, respectively, whereby said at least one plate can be sandwiched between said mounting means and the optional piece without the requirement of additional equipment, said fastening means insertable through aligned openings in said mounting means, plate and optional piece.

* * * * *